United States Patent
Ebenbichler

[11] 3,814,500
[45] June 4, 1974

[54] LIGHT REFLECTOR CONSTRUCTION FOR DETERRING GAME FROM CROSSING HIGHWAYS

[75] Inventor: Hubert Ebenbichler, Absam-Eichat, Tirol, Austria

[73] Assignee: D. Swarovski & Co., Tirol, Austria

[22] Filed: May 5, 1972

[21] Appl. No.: 254,773

[30] Foreign Application Priority Data
May 7, 1971  Austria .............................. 3994/71

[52] U.S. Cl. ................ 350/97, 350/287, 350/299, 350/288, 350/293, 404/10
[51] Int. Cl. .............................................. G02b 5/12
[58] Field of Search ....... 350/67, 97, 102, 103, 293, 350/286, 287, 288, 299; 94/1.5; 404/9–16

[56] References Cited
UNITED STATES PATENTS

| | | | |
|---|---|---|---|
| 752,429 | 2/1904 | Wadsworth | 350/106 |
| 1,743,835 | 1/1930 | Stimson | 350/103 |
| 2,154,360 | 4/1939 | Schell et al. | 350/109 |
| 2,328,407 | 8/1943 | Becker | 350/97 |
| 2,426,163 | 8/1947 | Booth | 350/100 |
| 2,592,238 | 4/1952 | Brammer | 350/97 |
| 3,057,250 | 10/1962 | Griffith | 350/287 |
| 3,458,245 | 7/1969 | Stanley | 350/67 |
| R26,617 | 6/1969 | Staunton | 350/286 |
| 3,485,148 | 12/1969 | Heenan | 350/67 |

FOREIGN PATENTS OR APPLICATIONS
1,103,487  4/1954  France .............................. 350/100

Primary Examiner—John K. Corbin
Assistant Examiner—Michael J. Tokar
Attorney, Agent, or Firm—Toren, McGeady and Stanger

[57] ABSTRACT

A light reflector construction is disclosed which is suitable for deterring game from crossing highways when a motor vehicle approaches the reflector.

The reflector comprises a plurality of juxtaposed prisms with the cross section of each prism corresponding essentially to an isosceles, right angled triangle, the hypotenuse surfaces of the prisms forming the rear surfaces. The rear surfaces are capable of reflecting a light beam striking the prisms and at least one of the surfaces of each prism, when viewed in the cross section of the prism, being curved so as to scatter or diffuse reflected light. The rear surfaces of the prisms are either capable of total reflection and/or are provided with mirror layers.

31 Claims, 9 Drawing Figures

3,814,500

LIGHT REFLECTOR CONSTRUCTION FOR DETERRING GAME FROM CROSSING HIGHWAYS

BACKGROUND OF THE INVENTION

1. Field of Invention

The invention relates to reflector constructions which are mounted adjacent highways in locations where game, such as deer, has a tendency to cross from one side of the highway to the other.

2. Background Information and Prior Art

It is well known that serious accidents frequently occur by the collision of motor vehicles with game, such as deer, who attempt to cross the highway travelled by the motor vehicle. Experience has indicated that it is extremely difficult to deter the game from crossing highways in an effective manner. From a practical point of view, highway crossing of game is successfully prevented only by the erection of fences of sufficient height and strength. To erect fences along long stretches of highway is, of course, extremely expensive. In addition, the presence of permanent fencing has the disadvantage that the game may leave the area in question resulting in detrimental environmental effects and loss to the proprietor of the district.

SUMMARY OF THE INVENTION

It is a primary object of the present invention to provide game crossing deterring means which are effective on a temporary basis only, to wit, only when a motor car approaches the game crossing deterring means but which have no deterring effect when the highway is untravelled so that the game may cross the highway at such time.

Another object of the present invention is to provide a light reflector construction for the indicated purpose which, when struck by the beam of the headlight of an approaching vehicle, reflects the light away from the highway and towards the adjacent terrain in a direction substantially right angular to the travelling direction of the vehicle in a spreading, fan-like manner, thereby scaring the game and deterring it from approaching the highway.

In this manner, a light barrier which in fact is an optical fence is created which is avoided by the game. If a deer or the like animal is in the process of approaching the highway, the deer will "freeze" as soon as it is struck by the reflected light and will then flee in a direction away from the highway. However, as soon as the motor vehicle has passed the reflector construction and the light beam is thus extinguished, the reflector construction has no deterring effect anymore and the game can cross the highway.

Although the frightening effect caused by the reflected light occurs at night time only, the game will soon learn that there is a causal connection between the noise of an approaching motor vehicle and the scaring effect of the reflected light. This means that even during daytime the game will avoid after some time the highway when the noise of an approaching vehicle is heard even though the scaring effect of the reflected light is absent. Such behavior of game is in conformity with the so-called Pawlow reflex.

In order to present an effective light barrier along the entire stretch of highway where game crossing normally can be expected, it is recommended that the inventive reflector structures be mounted at suitable distances from each other along the highway. Experiments have indicated that reflectors erected at distances of from 10 to 30 meters from each other yield excellent results and create an effective game crossing deterring means. At night-time the row of reflectors extending along the highway then presents to the game the image of a series of illuminated points which in itself may have a deterring effect on the game.

From a practical point of view, it is advantageous to color the reflected light red since it is known that many wild animals avoid red colored light. In addition regulations in several countries propose game crossing warning devices of red colored light points.

A further object of the invention is to provide a reflector construction of the indicated kind which is adjustable and settable both in respect to the direction and size of area into which the light is to be reflected and also in respect to the intensity of the reflected light.

Still a further object of the invention is to provide a reflector construction of adjustable effect which can be easily cleaned, which has a long lite without requiring service and which is inexpensive and simple to produce.

Briefly, an inventive light reflector suitable for deterring game from crossing terrain, such as a highway, comprises prism means which are formed by a plurality of juxtaposed prisms. The cross section of each prism corresponds essentially to an isosceles, right angled triangle, the hypotenuse surfaces of the prisms forming the rear surface of the prism means. The rear surface of the prism means is capable of reflecting a light beam striking the prism means and at least one of the surfaces of each prism, viewed in the cross section of the prism, is curved so as to scatter or diffuse reflected light.

The headlight beam of an approaching motor vehicle is thus deflected in a direction away from the highway and towards the terrain by total reflection or by providing mirror layers or coatings at the rear surface of the prisms. THe rear surface of the prisms is thus capable of total reflection and/or mirror surfaces are provided. THe prisms which are arranged in juxtaposed manner and which may form a single integral unit in the form of a plate are preferably colored red in order to obtain reflected light of red color.

As will be clear from the above, the hypotenuse surfaces of the prisms abut at the edges of the prisms. In a particularly advantageous embodiment all the prisms form an integral unit or plate-like structure so that all hypotenuse surfaces form a continuous planar surface.

In order to protect the prism means from atmospheric influences and to avoid soiling, it is recommended that the prism means is enveloped or built into a light permeable housing or casing.

The various features or novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

Figure 1:
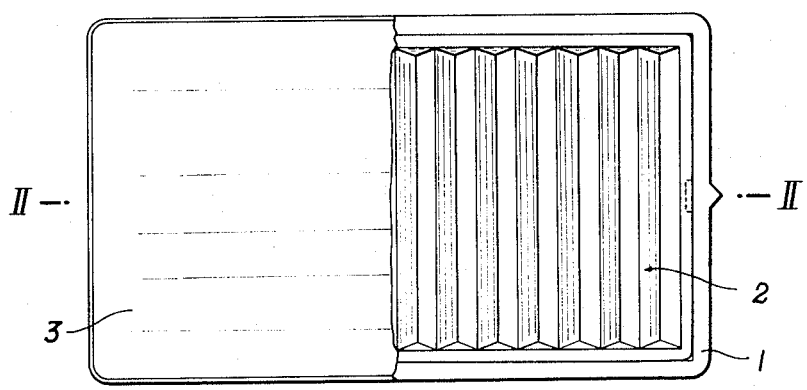
FIG. 1 is a plan view of an inventive reflector construction, the cover of the casing for the construction having been removed from the right-hand half of the view.
Figure 2:
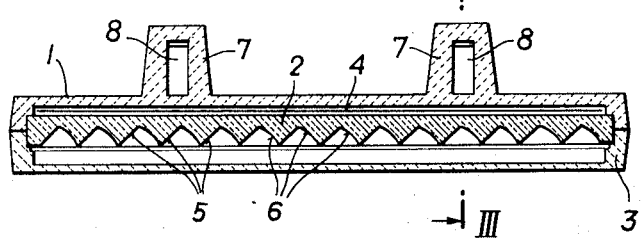
FIG. 2 is a sectional view along line II—II of FIG. 1.
Figure 3:
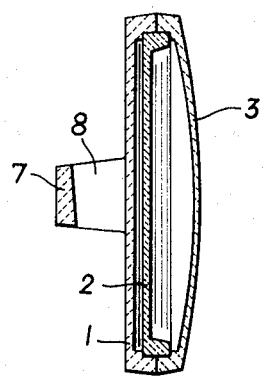
FIG. 3 is a sectional view along line III—III of FIG. 2.

Turning now to the drawings and in particular FIGS. 1, 2 and 3, it will be noted that the reflector construction comprises a housing bottom support 1 which supports a prism plate 2, the prism plate being formed from a plurality of individual prisms joined into the plate. A housing cover 3 fits on the bottom support 1, the plate 2 thus being enveloped by the housing formed by the bottom support 1 and the cover 3. The housing 1, 3 may, of course, be made of any suitable material such as metal or plastics while the prismatic plate 2 may be made of glass or a suitable plastic. If the bottom 1 of the housing is made of a transparent material, then an aluminum foil 4 as indicated in FIG. 2, is interposed between the bottom 1 and the prism plate 2, thus forming a mirror-like surface. The aluminum foil 4 need not be provided if the bottom 1 of the housing is made of a reflecting material such as, for example, a diecast metal.

Figure 9:
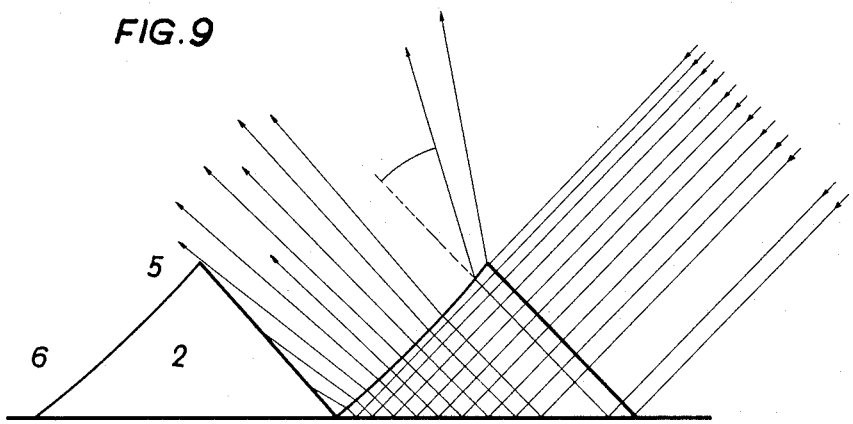
FIG. 9 represents the course of light rays striking a prism of an inventive reflector construction.

The prisms of the prism plate 2 have planar prism surfaces 5 (see FIG. 2) as well as concave or curved prism surfaces 6. As best seen in FIGS. 2 and 9, light, to wit, light emanating from the headlight of a motor vehicle, which strikes the planar prism surfaces 5 in a direction substantially perpendicular to the plane of the surfaces 5, is totally reflected at the rear side of the prism plate 2, to wit, the hypotenuse surfaces of the prisms. The reflected light exits from the prism at the concave prism surfaces 6 (see FIG. 9) and is scattered or diffused to an extent dependent on the curvature of the surfaces 6. The scattering angle $\tau$ may, as seen from FIG. 9, be varied within wide limits by correspondingly choosing the radius of curvature of the prism surfaces 6.

If, by means of faulty mounting of the reflector, no total reflection is achieved, reflection is then achieved by the provision of the aluminum foil 4.

The vertical scattering or diffusion can be obtained, for example, by arching the prism plate in a cylindrical manner, the axis of the cylinders extending perpendicular to the edges of the prisms. Further, vertical scattering or diffusion may be obtained by constructing the cover plate 3 as a cylindrical dispersing lens. By suitably connecting the housing bottom with the housing cover in a water-tight manner, for example, by cementing, welding or the like, a completely sealed unit is obtained thus preventing corrosion or soiling of the interior optical surfaces of the construction. The prism means thus are effectively protected against atmospheric influences. The exterior surfaces of the housing can, of course, be easily cleaned and will, in fact, be self-cleaning when it rains. The cleaning of the exterior housing surfaces is facilitated by their smooth configuration.

The reflector construction may, of course, be mounted on a pole or the like in any suitable manner known per se from the mounting of box-like objects to poles. In the embodiment here shown the casing or housing has two projections or mounting means 7 which are provided with slots 8 for securing at a perforated strip of sheet metal or the like. The connection between the strip of sheet metal and the projections 7 is accomplished by insertion of a wedge or the like (not shown) into the slot 8. The strip of sheet metal (not shown) has bores for securing it to a pole in a suitable manner. Further, it is recommended that the sheet metal strip has an area of reduced cross section so as to form a desired bending area. Prior to mounting the reflector on the pole, that portion of the sheet metal strip which serves as supporting arm can then easily be brought into the correct and desired position. The actual positioning of the reflector structure relative to the pole will be determined by the elevation and course of the highway and the terrain to be illuminated.

Figure 6:
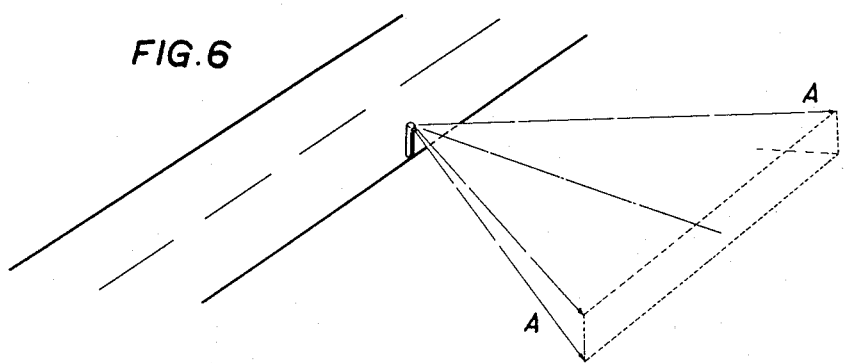
FIG. 6 indicates the fan-like spreading of the reflected light beam towards the terrain and away from the highway.
Figure 7:
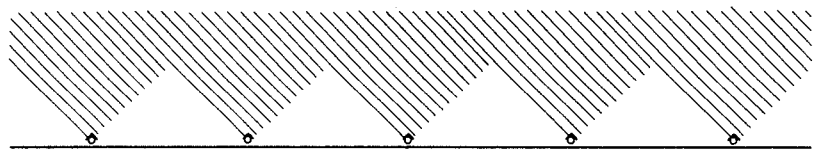
FIGS. 7 and 8 indicate diagrammatically the range of the light rays deflected by the reflectors.
Figure 8:
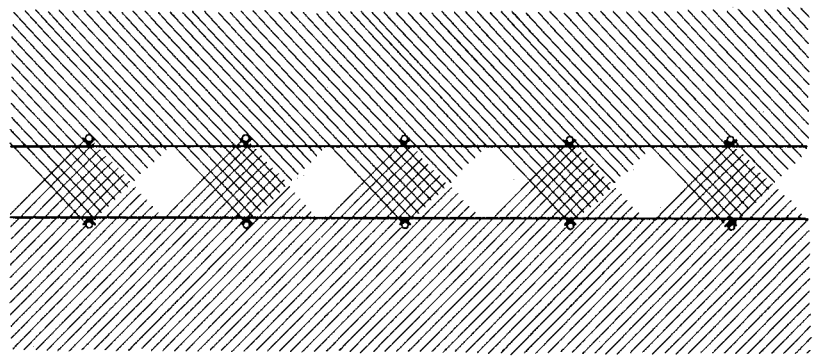

The most successful deterring action is obtained if the chain of reflector units mounted along the highway exerts a particularly shocking and immobilizing light effect along a relatively narrow strip to the left and right of the highway. In order to adapt the reflector chain to an optimum extent to the specific peculiarities of the terrain in question, it is usually necessary to use reflectors with different light spreading characteristics which are capable of being adjusted in the desired manner. If the respective terrain makes it possible, it is, for example, recommended that the reflectors which reflect the light towards the right are erected on the left-hand side of the highway while the reflectors which radiate the light towards the left should be mounted on the right-hand side of the highway. In this manner "dead space" in the region immediately adjacent and between the individual reflectors is kept as small as possible. This concept is clarified in FIGS. 7 and 8. In terrain through which the highway passes in curved manner, reflectors with large horizontal spreading capability of the reflected light are generally preferred (see FIG. 6) while in hilly terrain it is advantageous to use reflectors having a large vertical spreading action. In some instances it is advantageous to use reflectors which combine large horizontal spreading with large vertical spreading. In respect of highways or streets on which vehicles are permitted to travel at high speeds, it is recommended to use reflectors with very small spreading capacity. In this manner the deterring action reaches further into the respective terrain adjacent the highway. However, it will be appreciated if reflectors of the latter kind are used, the distances between adjacent reflectors have to be reduced.

The threshold beyond which the desired scaring action of the reflectors sets in is, of course, largely dependent on the ambient illumination.

The radius of curvature of the concave prism surfaces can be readily calculated from the following relation after a desired scattering angle $\gamma$ has been chosen (see FIG. 9).

$$r = s \cdot K$$

$$K = n^2 - 2n \cos \gamma + 1/2 \sin \gamma$$

Figure 4:
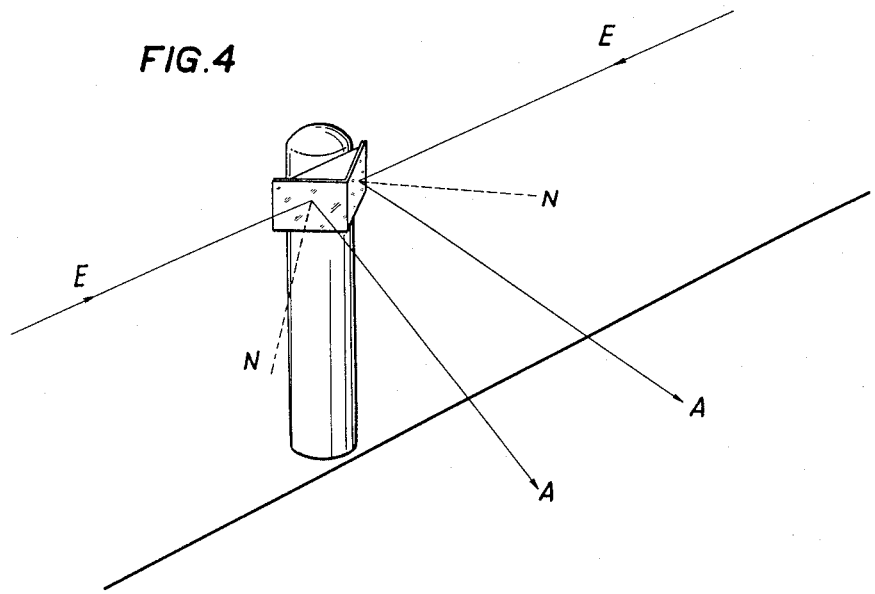
FIG. 4 is a diagrammatical illustration of inventive reflectors secured to a pole along a highway.
Figure 5:
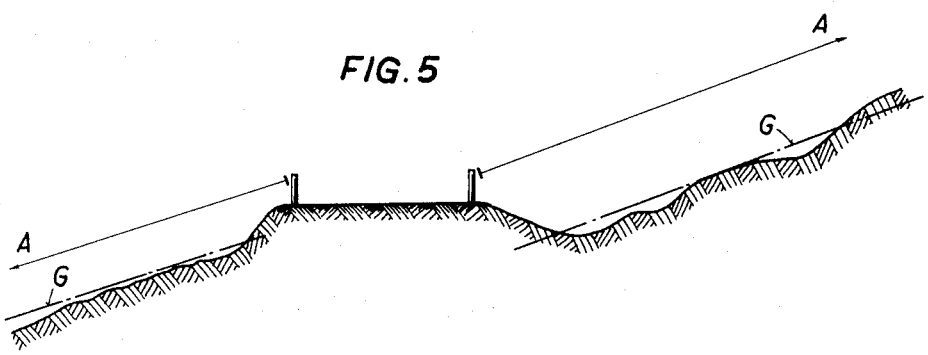
FIG. 5 shows by way of example the manner in which the position of reflectors is adjusted in order to adapt them more suitably to the peculiarity of the respective terrain.

$n$ = index of refraction $s$ = length of edge $\gamma$ = scattering angle $r$ = radius of curvature In order properly to adjust or set the position of the reflector, the respective terrain is approximated in the effective range of a reflector through a generally inclined plane G. The centrally reflected ray A then assumes a direction which is parallel to the plane G and extends substantially perpendicular to the edge of the highway (see FIG. 5). Accordingly, if the reflector is properly adjusted, the front surface of the reflector assumes a substantially vertical position (FIG. 4), the normal of the surface including with the impinging light ray an angle of 45 degrees. The striking central ray, the normal of the area and the exiting central ray are all situated in one plane. The planar prism surfaces 5 extend perpendicular or almost perpendicular to the incoming light ray.

It will be appreciated that the invention is not limited to the specific embodiment as shown in the drawings. Thus, for example, instead of combining the prisms into plate formation as shown, individual prisms may be arranged in juxtaposed positions so that the hypotenuse surfaces of adjacent prisms abut at their edges. Further, it is not necessary that the surface of the prism through which the reflected light exits is curved but it is certainly feasible that the curvature is provided at another surface of the prism. It is merely necessary that the reflected light is spread in a fan-like manner and this is certainly possible by providing the curved surface at a location other than that of the exiting light. Moreover, the aluminum foil may be part of or connected with the casing bottom or the respective prism plate. Instead of providing an aluminum foil the rear sides of the prisms may be directly provided with a mirror surface. Of course, the mounting of the reflectors on poles and the like can be effected in many different ways.

What is claimed is:

1. A light reflector comprising a plurality of juxtaposed prisms, each prism having a substantially similar right triangular cross section and including a pair of light transmitting front surfaces and a reflecting rear surface so that light striking said prism in a front plane is angularly reflected in the front plane in a direction which extends about 90 degrees relative to the direction of the light striking the prism, at least one of the prism surfaces of each prism being curved so that said light is reflected in a fan-like spreading manner, each of said prisms having elongated faces with parallel edges.

2. A light reflector suitable for deterring game from crossing terrain, such as a highway, located adjacent the reflector, comprising: prism means formed by a plurality of juxtaposed prisms, the cross-section of each prism corresponding essentially to an isosocles, right angled triangle whose legs define a pair of light transmissive front surfaces, the hypotenuse surfaces of the prisms forming the rear surface of said prism means, said rear surface being capable of reflecting a light beam striking one of the front surfaces of the prism means in a front plane, at least one of the surfaces of each prism, viewed in the cross-section of the prism, being curved so as to scatter reflected light in the front plane through the other of the front surfaces.

3. A light reflector as claimed in claim 2, wherein said rear surface of said prism means is capable of total reflection.

4. A light reflector as claimed in claim 2, wherein said rear surface of said prism means is provided with a mirror-like layer.

5. A light reflector as claimed in claim 2, wherein the hypotenuse surface of each prism abuts the hypotenuse surface of the adjacent prism, whereby the hypotenuse surfaces of all the prisms form a continuous planar surface.

6. A light reflector as claimed in claim 2, wherein the surface of each prism which is curved is the front surface through which the reflected light is scattered.

7. A light reflector as claimed in claim 2, wherein said plurality of juxtaposed prisms are united to form an integral unit in the form of a plate.

8. A light reflector as claimed in claim 2, further comprising a light permeable housing, said prism means being enveloped by said housing.

9. A light reflector as claimed in claim 8, wherein said housing is sealed to prevent entry of moisture and dirt.

10. A light reflector as claimed in claim 8, wherein said housing has a bottom portion which is impermeable to light, said prism means being mounted within the space defined by said housing so that the hypotenuse surfaces of said prisms are spaced from said bottom portion, the space between said bottom portion and said hypotenuse surfaces being filled with air, said prisms being capable of total reflection of light striking said prisms.

11. A light reflector as claimed in claim 8, wherein said housing has a bottom portion, said bottom portion being provided with a light impermeable layer.

12. A light reflector as claimed in claim 8, wherein said housing has a cover portion, said cover portion being constructed as a lens.

13. A light reflector as claimed in claim 12, wherein said lens is a cylindrical dispersing lens.

14. A light reflector as claimed in claim 2, wherein said prisms are colored red.

15. A light reflector construction suitable for deterring game from crossing a highway adjacent the reflector comprising a housing including a light transparent cover, a prism plate mounted within said housing behind said cover, said prism plate comprising a plurality of juxtaposed prisms, the cross-section of each prism corresponding essentially to an isosceles, right angled triangle whose legs define light transmissive front surfaces, the hypotenuse surfaces of the prisms forming the rear surface of said prism plate, said rear surface being capable of reflecting a light beam striking the prisms so that light striking said prisms in a front plane is reflected by said rear surfaces in the front plane in a direction extending substantially 90° to the direction of the striking light, at least one of the surfaces of each prism being curved in such a manner that the reflected light is spread in a fan-like manner by said curved surfaces.

16. A construction as in claim 15, wherein respective surfaces of said prisms each have parallel edges, and wherein said plate is mounted so that said edges are more vertical than horizontal.

17. A construction as in claim 16, wherein said edges are substantially vertical.

18. A construction as in claim 16, wherein in each prism one of the front surfaces faces the direction of oncoming light on the highway.

19. A construction as in claim 18, wherein in each prism the said one of the front surfaces is substantially transverse to the direction of travel along the highway.

20. A construction as in claim 17, wherein the rear surface of said prism plate is substantially vertical and extends angularly relative to the direction of the highway.

21. A construction as in claim 20, further comprising a second prism plate, said second prism plate comprising a plurality of juxtaposed prisms, the cross-section of each prism corresponding essentially to an isosceles right triangle, the hypotenuse surfaces of the prisms forming the rear surface of said second prism plate, each of said prisms, in said second prism plate having surfaces with parallel edges, the rear surface of said second prism plate extending at right angles to the hypotenuse surface of said first prism plate.

22. A construction as in claim 17, wherein the rear surface of said prism plate extends substantially 45° relative to the direction of the highway.

23. A construction as in claim 21, wherein the rear surface of said prism plates each extend 45° relative to the direction of the highway and at right angles relative to each other.

24. A reflector as in claim 18, wherein the front surfaces facing the direction of the oncoming light are flat and the front surfaces at right angles to the front surfaces facing the oncoming light are curved.

25. A reflector as in claim 2, wherein respective surfaces of said prisms each have parallel edges.

26. A reflector as in claim 2, further comprising second prism means formed by a plurality of juxtaposed prisms, the cross-section of each prism in said second prism means corresponding essentially to an isosceles right-angled triangle, the hypotenuse surface of the prisms of said second prism means forming the rear surface of said second prism means, said rear surface of said second prism means being capable of reflecting a light beam striking the second prism means, at least one of the front surfaces of each of said prisms in said second prism means, viewed in cross-section of the prism, being curved so as to scatter reflected light, the rear surfaces of said first and second prism means being at right angles to each other.

27. A reflector as in claim 26, wherein said prism means are mounted at right angles relative to each other so that, in general, the remaining front surfaces of said first prism means face away from the remaining front surfaces of said second prism means.

28. A reflector as in claim 27, wherein respective surfaces of said prisms in said prism means each have parallel edges, all of the parallel edges being substantially parallel to the intersection of the rear surface of said first prism means with the rear surface of said second prism means.

29. A reflector as in claim 25, wherein the curved ones of said surfaces are curved about an axis parallel to the parallel edges.

30. A construction as in claim 16, wherein the curved ones of said surfaces are curved about an axis parallel to the parallel edges.

31. A light reflector as claimed in claim 6, wherein the front surface through which the reflected light is scattered has the curvature of a diverging lens.

* * * * *